Patented Apr. 3, 1951

2,547,188

UNITED STATES PATENT OFFICE 2,547,188

PROCESS AND REAGENTS FOR RESOLVING EMULSIONS

Truman B. Wayne, Houston, Tex.

No Drawing. Application November 20, 1942,
Serial No. 466,527

18 Claims. (Cl. 252—336)

This invention relates to a process and reagents for resolving petroleum emulsions of the character commonly encountered in the production, handling and refining of petroleum. The subject matter of this application is a continuation-in-part of my prior applications, Serial No. 152,276, filed July 6, 1937, now abandoned, and Serial No. 222,061, filed July 29, 1938, now issued as Patent No. 2,321,056, dated June 8, 1943, and is related generally to the subject matter of my prior application, Serial No. 222,058, filed July 29, 1938, now issued as U. S. Patent No. 2,214,784.

The principal object of this invention is to provide an improved process and reagents for treating petroleum emulsions to separate them into their component parts of oil and water.

Another object is to provide a novel product or reagent which is water-wettable, interfacial and surface-active in order to enable its employment as a demulsifier or for such uses where water-wettable properties and characteristics are necessary or desirable.

Further objects will appear from the following in which the reagents and the processes for their employment will be described as related to their employment for the treating of petroleum emulsions.

The present process comprises subjecting a petroleum emulsion of the water and oil type to the action of small proportions of a complex organic condensation product of high molecular weight, resembling somewhat the synthetic resins produced by the condensation of two or more organic bodies containing resinophore groups but differing from the conventional synthetic resins or modified synthetic resins in that they have been rendered suitable for petroleum dehydration through structural modification which imparts to them the characteristics or properties necessary for this purpose.

My prior Patents Numbers 1,912,330, Re. 20,717 and 1,937,259 have all disclosed the broad idea of preparing petroleum demulsifiers from substances ordinarily used in the production of the hard, insoluble, infusible synthetic resins of commerce. It was disclosed in these patents that if reactions between these chemical bodies are allowed to proceed under certain conditions that modified resins are obtainable which, though resembling the insoluble, water-repellent resins used in the plastics and paint industries, possess the additional property of being water-wettable, interfacial, and surface-active. It was further shown that some of the modified resin demulsifiers so produced are water soluble or oil soluble, and that some of them may be both water and oil soluble to the extent necessary for petroleum demulsification. If water wettable and water soluble to the slight extent necessary to form colloidally hydrated solutions, the demulsfying properties seem to reach a maximum under the conditions met in actual field application of the treating process.

The present invention is an extension and improvement on the general class of demulsfying process disclosed in my prior Patent Re. No. 20,717 which disclosed the use of a broad class of substances derived from "a phenolic body and one or more aliphatic bodies containing resinophore groups, together with a modifying agent capable of preventing the production of a reaction product of the hard, insoluble, synthetic resin type." The term "phenolic body" was broadly used to include the usual phenolic substances such as the monohydroxy and polyhydroxy phenols, and their homologs; phenol carboxy acids such as hydroxy benzoic acids, hydroxy phthalic acid, and also other resin-forming acidic aromatic bodies such as phthalic acid or its anhydride which are capable of reacting with resinophore aliphatic bodies to form resins of the synthetic type. The latter substances are not phenols, but are strict equivalents of the latter in that they are resin-forming, aromatic bodies whose acidic properties render them capable of undergoing reactions whose products are characterized by the presence of one or more phenyl, phenylene, naphthyl, or similar groups or residues in intimate association with the corresponding aliphatic residues resulting from condensation and polymerization. The term "phenoloid" was used in the above mentioned patent to cover such phenol-like substances in reference to their resin-forming properties.

Certain substituted amine derivatives of hydroxy-alkylamines were disclosed in my patents, Nos. Re. 20,717, and 1,937,259. These were prepared by reacting hydroxy-alkylamines with reactive resinoid bodies. The latter had previously been prepared from suitable resin-forming bodies under conditions described in the patent which allowed the production of suitable demulsifiers. The term "reactive" as used above refers to the presence of carboxyl or sulfo groups, or both, in the resinoid molecule which react with the amine. In my Patent 2,214,784 disclosures were made in several specific examples of alkylol amine soaps, amides and esters of the fatty acids of pine, derived from the product "talloel." These soaps, amides and esters thus derived from an alkylol amine and these fatty acids are then condensed with a polybasic carboxy acid to form a complex ester which is water-wettable, surface-active and interfacial, hence is suitable as a petroleum demulsifier.

In my copending application, Serial No. 152,276, filed July 6, 1937, a class of substituted hydroxy alkyl amines was also disclosed, but were distinguished from the amino derivatives of my prior patents by the fact that the hydroxy alkyl amine itself provides the nucleus or starting part for the synthesis of the molecule. The amine was first reacted with one or more molecular equivalents of a higher fatty acid to form the alkylol amine derivative. This derivative is then reacted with a polybasic carboxy acid to esterify the hydroxyls of the amine derivative. It was pointed out in that application that condensation products could be prepared, having either free carboxyl or hydroxyl groups, and that these molecules, dissimilar as to the free carboxyl or hydroxyl groups, could be condensed to build a product of extremely high molecular weight, provided however, that the resultant product is surface-active and water-wettable.

My copending application, Serial No. 222,061, filed July 29, 1938, also disclosed condensation products of the water wettable, surface-active alkyd ester type. In Example III of that application (Example V of the present application) a condensation product is described, which is derived by first reacting an alkylol amine with castor oil at 90–100° C. in the presence of a solvent to form the alkylol amine derivative. This derivative is then heated with phthalic anhydride 4-sulfonic acid at 125–135° C. for four hours. In Example IV (Example VI here) this condensation product is heated further at 150–250° C. to more completely esterify and condense the product. Example V (Example VII here) describes a further embodiment wherein the alkylol amine and the fatty acid ester are heated to a higher temperature, whereby the fatty acid amide is first formed. Example VII (Example VIII here) discloses a procedure whereby the fatty-acid amine soap-ester formed from a fatty acid and an alkylol amine may be obtained. Thus there are three possible reactions between the alkylol amine and a fatty acid or its equivalent ester, and the final product obtained depends somewhat on the temperatures and heating periods employed.

It was thus disclosed in these examples of application, Serial No. 222,061, that fatty acids, such as oleic or ricinoleic and the corresponding esters, such as, for instance, castor oil (triricinolein) are equivalents as sources of the fatty acid radical, F.COOH, or F.(OH).COOH. Moreover, the equivalence of the fatty acids and their corresponding esters was previously shown in my Reissue Patent No. 20,717.

That the reactions involving fatty acids, or their equivalent esters, and alkylol amines, may take several possible courses is obvious to those skilled in organic chemistry, and this was also pointed out in the above mentioned examples of application, Serial No. 222,061.

The petroleum demulsifiers contemplated in the present invention may be described as derivatives of a hydroxy amine preferably selected from the group comprising alkylol amines, a detergent-forming acid which includes the aliphatic acids having at least eight carbon atoms in the hydrocarbon chain, rosin and resin acids, naphthenic acids, and the like. The preferred members of this group are the fatty acids, which may be hydroxylated or substituted in the fatty chain by $SO_3H$, $HSO_4$, benzenoid residues, carboxy acid residues or other substituents. Of the fatty acids, the preferred ones are oleic, ricinoleic, linoleic, linolenic and modified fatty acids, such as the various sulphonic acid modified fatty bodies well known in the art of breaking emulsions, other types of modified fatty bodies formed by oxidation, hydroxylation and partial decomposition by blowing with air, treating with oxidizing agents, halogens followed by hydrolysis, or dry distillation in vacuo, etc.

Structurally, the alkylol derivative, which comprises the first reaction product in the preparation of my improved demulsifying composition, may be illustrated by several somewhat similar type formulas, the distinctions between these originating in the specific type of alkylol amine derivative thus described. For instance, where the alkylol amine forms a soap with one molecule of a detergent forming acid, and where the alkylol radicals may or may not have been esterified by additional molecular equivalents of the detergent-forming acid compound, the compound may be illustrated by the formula:

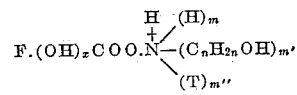

where $F.(OH)_xCOO$ represents the acyl radical derived from a detergent-forming acid;

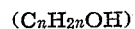

represents an alkylol radical; and (T) represents an alkyl, aralkyl, or an acylated alkylol group; $x$ represents the number of hydroxyl groups designated by the numeral 0, 1 or 2; $m$ represents the numeral 0, 1 or 2; $m'$ represents the numeral 1, 2 or 3; and $m''$ represents the numeral 0, 1 or 2; and with the proviso that $m+m'+m''=3$.

If the alkylol amine derivative is an amide, as hereinabove described, it may be represented structurally as follows:

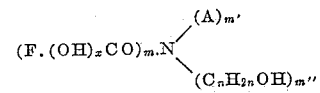

where $F.(OH)_xCO$ represents a residue from a detergent-forming acid; (A) represents a hydrogen atom or an alkyl aralkyl, or an acylated alkylol group; $(C_nH_{2n}OH)$ represents an alkylol radical; $x$ represents the number of hydroxyl groups designated by the numeral 0, 1 or 2; $m$ represents the numeral 1 or 2; $m'$ represents the numeral 0, 1 or 2; $m''$ represents the numeral 1 or 2; and with the proviso that $m+m'+m''=3$.

If the alkylol amine is esterified to the exclusion of soap or amide formation, as may be the course of the reaction between an alkylol amine and a fatty acid ester, such as triolein, triricinolein, etc., the resulting ester may be represented by the type formula:

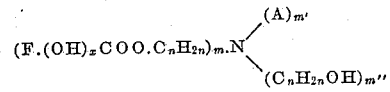

where $F.(OH)_xCOO$ represents the acyl radical derived from a detergent-forming acid; $(C_nH_{2n})$ represents the residue from an alkylol radical; (A) represents a hydrogen atom or an alkyl, aralkyl or an acylated alkylol group; $x$ represents the number of hydroxyl groups designated by the numeral 0, 1 or 2; $m$ represents the numeral 1, 2 or 3; $m'$ represents the numeral 0, 1 or 2; and $m''$ represents the numeral 0, 1 or 2; and with the proviso that $m+m'+m''=3$.

Suitable amines are the various primary, secondary and tertiary alkylol amines, such as monoethanolamine, diethanolamine, triethanolamine and the corresponding amines higher in the homologous series. One may also employ the various non-hydroxy alkylamines, aralkylamines, alicyclic and hydroxy aromatic amines when the hydroxylation of the molecule has been otherwise provided. Hydroxylation of these amines is readily accomplished by reacting them with suitable glycol and glycerol chlorohydrins, alkylene oxides, etc. Triethanolamine is preferable, because of its ready availability and low cost. Any relatively stable hydroxylated amine whose basicity is similar to the alkylamines in contradistinction to the weekly basic aromatic amines is suitable.

Suitable polybasic carboxy acids may be selected from either the aromatic or aliphatic series. Mixed resins using acids from both series are also contemplated. Phthalic anhydride is readily available at low cost, hence is the preferred polybasic carboxy acid. However, other polybasic carboxy acids or their anhydrides such as maleic, naphthalic, succinic, hydroxy phthalic or diphenic may be used. Sulfophthalic anhydride is also a member of the group comprising suitable polybasic carboxy acids, as it contains two carboxyl equivalents in the form of the anhydride radical and additionally contains a sulphonic acid radical. While it may, under certain conditions act as a tribasic acid, it is nevertheless a dibasic carboxy acid containing an additional acid valence in the form of a sulphonic acid radical. In the preparation of some condensation products of the type herein contemplated, it is preferable that the sulphonic acid radical of sulfophthalic anhydride be converted to a salt, ester, or amide, so that the sulphonic acid acidity of the compound be reduced or eliminated prior to condensing it with the hydroxylated bodies herein described. Partial esters of these polybasic carboxy acids with hydroxy bodies, particularly hydroxylated fatty acids and their corresponding esters, are likewise contemplated.

In order to illustrate specifically the new type of condensation product contemplated for use in accordance with the present invention, I have set forth below several examples of the type of product suitable for use. However, it is to be understood that I do not confine myself to the specific chemicals, or proportions thereof set forth in these examples, as it will be readily apparent that equivalents of these specific chemicals and their various derivatives, or other proportions may be employed without departing from the spirit of the invention or the scope of the appended claims.

*Example I*

Three hundred pounds of ricinoleic acid are reacted with 150 pounds of commercial triethanolamine in the presence of 300 pounds of coal tar solvent naphtha at 100°–110° centigrade to form the amine soap. To this is added 296 pounds of phthalic anhydride and the reaction is continued at 150° centrigrade for an additional four hours in an apparatus fitted with a condenser and water trap. The naphtha and water vapors are collected in the trap, the water is discarded, and the naphtha is continuously returned to the reaction kettle. After four hours the acid number of the resin is practically nil, or if acidity still remains the reaction can be continued for from two to four additional hours. Any remaining acidic material may be neutralized with ammonium hydroxide, an alkyl amine or other basic material.

The product of the above reaction is a clear amber oil, and may be used without additional modification in the treatment of petroleum emulsions.

*Example II*

This is the same as Example I excepting that a molecular equivalent of maleic or succinic anhydride is substituted for the aromatic dibasic carboxy acid used in the preceding example.

*Example III*

Two hundred and eighty-five pounds of oleic acid and 150 pounds of commercial triethanolamine are reacted at 100°–110° centigrade in the presence of 300 pounds of coal tar naphtha, followed by the addition of 296 pounds of phthalic anhydride and 312 pounds of castor oil. The mass is heated at 150°–160° centigrade for from four to eight hours, or until carboxyl acidity has substantially disappeared. This product may be used in its present state, or the carboxyl hydrogen of the ricinoleic ester may be saponified with ammonium hydroxide to render the product more soluble in water.

The above product differs from those disclosed in Examples I and II in that one free carboxyl remains on one dibasic acid residue which is esterified by the alcoholic hydroxy function of the castor oil, instead of esterifying a hydroxyl group on the fatty acid residue F.COO, as in Example I.

*Example IV*

Three hundred pounds of the oil, resinous body from any of the preceding examples is sulfonated with 300 pounds of oleum while maintaining the temperature below 60° centigrade. The acid mass is carefully poured into ice water, and after vigorous agitation is allowed to stratify. The lower acid layer is removed, and the upper layer is withdrawn, carefully neutralized to the methyl orange endpoint, boiled with NaCl solution, and again allowed to separate into two layers. The upper layer is recovered and is useful in the resolving of the most stubborn emulsions.

*Example V*

936 parts of castor oil, in solution in 450 parts of solvent naphtha or sulfur dioxide extract, is converted to the diethanolamine derivative by heating at 90–110° C. with 315 parts of technical diethanolamine. The derivative is then cooled to 20–30° C. and 684 parts of melted phthalic anhydride 4-sulfonic acid is added. The mass is heated at 125–135° C. for four hours. Complete esterification does not occur at this temperature, but an addition product is formed by the anhydride radical and one of the hydroxyls present on the fatty amine derivative. Whether combination occurs at the hydroxyl on the fatty chain, or at the alkylolamine radical, is not known.

The product is preferably esterified by refluxing with an excess of anhydrous isopropyl or primary butyl alcohol, but may be neutralized with ammonia or other suitable base.

*Example VI*

The product described in Example III may be further condensed and polymerized by heating at temperatures ranging between 150° and 250° centigrade. The degree of condensation can be followed by noting the yield of water of esterification derived from condensation between the hydroxyl or amino groups on one hand, and the acidic groups on the other.

Example VII

The reacting chemicals and proportions may be the same as shown in the preceding Examples V and VI, but the procedure is varied by first forming the fatty amide of the alkylolamine and then subsenquently condensing the amide (instead of the fatty amine soap) with the sulfo-phthalic anhydride.

Example VIII 855 parts of oleic acid and 140 parts of triethanolamine in 450 parts of solvent naphtha are warmed 80–100° C. to form the triethanolamine soap with one molecular equivalent of the oleic acid. 10 parts of 98% $H_2SO_4$ are then added as a catalyst and the mass is heated at 190–220° C. in a vessel provided with a reflux condenser and moisture trap until 36 parts of water have been collected. The resulting oleic acid soap of triethanolamine, now having two of its hydroxyl groups esterified with oleic acid residues, is then heated at 135–150° C. for 4 hours with 228 parts of phthalic anhydride 4-sulfonic acid. The resulting product, which has one free carboxyl and a free sulfonic group, may be esterified with one or even two more equivalents of the above described alkylolamine soap-ester, or may be esterified with a monohydric or polyhydric alcohol, or converted to an amine soap or amide.

Example IX 322 parts of talloel, 100 parts of solvent naphtha, and 62 parts of monoethanolamine are mixed and heated at 100° C. for one hour to form the amine soap. To this soap is added 148 parts of phthalic anhydride and the heating is continued at 125° C. until the mono-phthalyl ester is formed. 60 parts of isopropyl alcohol are added and the mixture is refluxed at the boiling point (99–102° C.) for 4 hours to esterify the remaining carboxyl.

The above product is a neutral, oily, product, sufficiently wettable and dispersible in water to be of value as a petroleum demulsifier. It may be used without change, or may be sulfonated followed by conversion to a salt, ester or amide.

Example X

The same as Example IX except that instead of the monoethanolamine soap, the amide is used. This may be prepared by heating the soap to dehydrate it before condensing with phthalic anhydride.

Example XI

The di-talloel amide of monoethanolamine is prepared by heating 644 parts of talloel, 62 parts of monoethanolamine, 100 parts of solvent naphtha, and 7 parts of 98% $H_2SO_4$ to 155° C. where water formation begins. The temperature is raised gradually to promote the amide formation, and at 200–210° C. the reaction is complete. The di-talloel amide of monoethanolamine is then condensed with either one or two molecular equivalents of phthalic anhydride or sulfo-phthalic anhydride in the usual manner.

Example XII

A complex, resinous, derivative of talloel may be prepared by heating 644 parts of talloel, 140 parts of triethanolamine, 100 parts of solvent naphtha, and 10 parts of 98% $H_2SO_4$ until 16 parts of water, derived from esterification of one hydroxyl of the alkylolamine, have been collected. This may be accomplished at temperatures ranging between 150–175° C. By this procedure one molecular equivalent of the talloel forms a soap with the tertiary alkylolamine, while the second molecular equivalent of talloel esterifies one of the hydroxyl groups.

The complex ester-amine soap is then condensed with 148 parts of phthalic anhydride at 135–150° C. so that one free carboxyl and one free hydroxyl still remain intact on the molecule. The carboxyl may be esterified by heating with isopropanol, or may be neutralized to form a salt, or may be converted to an amide.

Example XIII 3513 pounds of castor oil, 110 gallons of refinery gas oil, and 194 gallons of Solvesso No. 3, an aromatic solvent oil of petroleum origin, and 500 pounds of commercial triethanolamine were charged into a kettle and heated to 110° C. where the heat was cut off and the temperature rose to approximately 115° C. The temperature was maintained at 115° C. for 4 hours, and a sample of the fluid drawn from the kettle was found to be entirely homogeneous. The steam was then shut off and the agitator stopped and the mass allowed to stand over night or for a total of approximately 15 additional hours during which time the temperature dropped only slightly, due to the well insulated kettle. At the prevailing temperature of approximately 100° C., 1650 pounds of technical phthalic anhydride were added to the kettle and the mass was heated while agitating to approximately 155° C. and maintained for 6 hours. 654 pounds of 99% isopropanol were then introduced through the side of the kettle and below the liquid level while stirring and refluxing to partially esterify the acidic condensation product. The unesterified isopropanol served to reduce the viscosity of the mixture to a point where it was satisfactory for feeding through the usual oil-field lubricators into the petroleum emulsion.

Example XIV 936 parts of castor oil 183 parts of monoethanolamine, and 300 parts of solvent naphtha were mixed and heated, with stirring, at 200° C. until 36 parts of aqueous distillate came over and were trapped. Then 10 parts of 98% sulfuric acid were added as a catalyst and the heating was continued at 200–205° C. until the remaining 18 parts of water were recovered which was the theoretical amount, assuming complete amide formation. To the oily liquid was added 440 parts of powdered phthalic anhydride, and the mass was heated while stirring to 150–155° C. over a period of approximately one and one-half hours. When 155° C. was reached, distillation of water began and the temperature was raised to 200° C. After holding at 200° C. for 2 hours, a total of 30 parts of aqueous distillate had been collected. The temperature was then raised to 208° C. for an additional 8 hours and the total amount of aqueous distillate was 48 parts. The final product was fluid and neutral to methyl orange.

Example XV 452 parts of talloel, which comprises a mixture of fatty acids extracted from pine, 81 parts of technical triethanolamine, and 100 parts of Solvesso No. 3 were mixed and heated to 150° C. at which point water began to distill over from the reaction mass. The reaction was stopped when 14.5 parts of water had been distilled over, and the resulting ester of triethanolamine was reacted with 59.2 parts of phthalic anhydride. The latter condensation was continued for 2 hours at 160° C. and then heated further at 220° C. for an additional 6 hours whereupon 13.5 parts of water were recovered as distillate. Since the theoretical amount of water was only 7.2 parts through the esterification of the phthalic acid carboxyls, it is evident that a further dehydration of the complex molecule occurred. The final condensation product was an oily liquid of medium viscosity.

*Example XVI*

312 parts of castor oil, 45 parts of commercial triethanolamine, and 100 parts of solvent naphtha were agitated and heated for 5 hours at 100° C. Then 148 parts of phthalic anhydrides were added and the mass was heated to 150° C. and held at this temperature for 2 hours. Then the temperature was raised and water began to distill off at 170° C. A further amount of water was secured as the temperature rose to 192° C. After 10 parts of water had distilled off, the heating was discontinued and 90 parts of 99% isopropanol added and the mixture refluxed for 1.5 hours to esterify the remaining carboxyls. The final product was neutral to methyl orange and proved to be a highly effective demulsifying agent.

*Example XVII*

4892 pounds of castor oil, 2403 pounds of solvent naphtha, and 680 pounds of triethanolamine were reacted at 110–115° C. for 4 hours and then allowed to remain over night in a well-insulated kettle for a total heating period of 19 hours. Then 2200 pounds of phthalic anhydride were added and the temperature of the mass was raised to 150° C. and held for 2 hours, after which the temperature was raised to 170° C. where water began to distill from the mass. The temperature was then raised to 192° C. and maintained at this temperature until approximately two-thirds of the theoretical water of esterification from the second carboxyl group of the phthalic anhydride had been recovered. At this point 981 pounds of 99% isopropanol were added to the mixture and refluxing was continued for approximately 2 hours. The final product was neutral to methyl orange and was a highly effective demulsifying agent.

Obviously many other combinations of these types of substances may be used in the preparation of numerous variations of the above products without departing from the scope and spirit of the appended claims. The properties of the various hydroxy alkylamines, polybasic carboxy acids, fatty acids and their esters will likewise influence proportions reaction, temperatures employed and other similar factors, because of different molecular weights, boiling and melting points etc., possessed by different members of any series of organic compounds. These various considerations, however, are within the knowledge and practices of the trained organic chemist and will be readily understood by those skilled in the art.

Various examples of the many products which answer the descriptions herein made are contemplated. Some may be oil soluble, others water soluble. In many instances they may possess dual solubility to an appreciable extent. Even apparent insolubility is of no consequence, as the products are all soluble at least to the extent necessary for segregation in the emulsion interface as a water-wettable colloid. The suitability of any of these products to the breaking and resolving of any given emulsion can readily be determined by the conventional procedures now in general use in oil fields and in laboratories which make such determinations.

Where reference is made to "fatty acids," it is understood to include aliphatic acids having eight or more carbon atoms in their hydrocarbon chain. As will be understood by those skilled in the art, rosin and resin acids, naphthenic acids, and the like are obvious equivalents for the fatty acids described in the present application. The term "detergent-forming" refers to these acids and also sulfonic acids derived from various aliphatic, alicyclic, hydroaromatic and aromatic bodies found in, or derived from, coal tar, asphalt, petroleum. etc.

Where reference is made to polycarboxy acids in the appended claims, it is understood that this term is meant to also include the corresponding anhydrides, as will be noted by reference to the examples hereinbefore given.

The term "water-wettable" as used in the specification and claims refers to the characteristic of the product which enables it to be readily wetted by water and which is usually accompanied by some degree of hydration of the product in contact with the aqueous phase of the emulsion. When the product segregates at the interface of the emulsion and is adsorbed at the interfacial film where the hydrophobe body responsible for the emulsion exists, the water-wettable property of this product counteracts the effect of the hydrophobe present in the emulsion and thus effects its resolution.

The term "water-soluble" is used to include the property of forming colloidally hydrated aqueous solution. From a following paragraph it will be seen that only a limited degree of actual "water solubility" is necessary for the reagents used for breaking petroleum emulsions, for the reason that extremely small proportions of the reagents are ordinarily used.

The term "oil soluble" is used to include the property of colloidal dispersion in the oil phase.

The improved treating agents prepared in accordance with the present invention are used in the proportion of one part of treating agent to from 2,000 to 20,000 parts (or, in some cases, as high as 30,000 parts) of petroleum emulsion, either by adding the concentrated product directly to the emulsion or after diluting with water or oil in the conventional manner. The treating agents may be used in any of the numerous ways commonly employed in the treatment of petroleum emulsions as will be apparent. For example, the new treating agents may be mixed with or used in connection with other well known petroleum resolving chemicals or compositions, if it is so desired. However, they are usually used most advantageously alone or when dissolved in a suitable solvent such as alcohol, solvent naphtha, or certain extracts from the solvent refining of petroleum hydrocarbons that are rich in aromatic hydrocarbons.

Having thus described the invention, what is claimed is:

1. A composition for resolving a petroleum emulsion and dispersible in such an emulsion, which comprises as a component, a water-wet-

11 table, interfacial and surface-active condensation product of a polybasic carboxy acid and a hydroxylated amino compound derived initially by a reaction selected from the group consisting of amidification, esterification and soap-formation between a detergent-forming acid and a hydroxy amine.

2. A composition for resolving a petroleum emulsion and dispersible in such an emulsion, which comprises as a component, a water-wettable, interfacial and surface-active esterification product derived by an esterification reaction between at least one molecular proportion of a hydroxylated amino compound and at least one molecular equivalent of a polybasic carboxy acid compound which is free from a hydroxylated fatty acid radical, said hydroxylated amino compound being first produced by a reaction selected from the group consisting of amidification, esterification and soap-formation between at least one molecular proportion of a detergent-forming acid compound and a hydroxylated amine.

3. A composition for resolving a petroleum emulsion and dispersible in such an emulsion, which comprises as a component, a water-wettable, interfacial and surface-active esterification product derived by an esterification reaction between at least one molecular proportion with respect to each other of a hydroxylated amino compound and an acidic polybasic carboxy acid compound characterized by the presence of at least one free carboxyl group and at least one residue derived from a hydroxylated detergent-forming acid compound, said hydroxylated amino compound being first produced by a reaction selected from the group consisting of amidification, esterification and soap-formation between at least one molecular proportion with respect to each other of a detergent-forming acid compound and a hydroxylated amine.

4. A process of resolving petroleum emulsions comprising, subjecting a petroleum emulsion to the action of a small percentage of a water-wettable, interfacial and surface-active condensation product of a polybasic carboxy acid and a hydroxylated amino compound derived initially by inter-action between a detergent-forming acid and a hydroxy amine.

5. A process of resolving petroleum emulsions comprising, subjecting a petroleum emulsion to the action of a small percentage of a water-wettable, interfacial and surface-active esterification product derived by an esterification reaction between at least one molecular proportion of a hydroxylated amino compound and at least one molecular equivalent of a polybasic carboxy acid compound which is free from a hydroxylated fatty acid radical, said hydroxylated amino compound being first produced by reaction between at least one molecular proportion with respect to each other of a detergent-forming acid compound and a hydroxylated amine.

6. A process of resolving petroleum emulsions comprising, subjecting a petroleum emulsion to the action of a small percentage of a water-wettable, interfacial and surface-active esterification product derived by an esterification reaction between at least one molecular proportion with respect to each other of a hydroxylated amino compound and an acidic polybasic carboxy acid compound characterized by the presence of at least one free carboxyl group and at least one residue derived from a hydroxylated detergent-forming acid compound, said hydroxylated amino compound being first produced by reaction between at least one molecular proportion with respect to each other of a detergent-forming acid compound and a hydroxylated amine.

7. A composition for resolving a petroleum emulsion and a dispersible in such an emulsion, which comprises as a component, a condensation product of a dicarboxy acid and a hydroxylated amino compound reacted only to an extent sufficient to produce a water-wettable, interfacial and surface-active compound, said hydroxylated compound being derived initially by a reaction selected from the group consisting of amidification, esterification and soap-formation between a higher fatty acid and a hydroxy amine.

8. A composition for resolving a petroleum emulsion and dispersible in such an emulsion, which comprises as a component, an esterification product derived by an esterification reaction between at least one molecular proportion with respect to the acid compound of a hydroxylated fatty amino compound and at least one molecular equivalent with respect to the amino compound of a polybasic carboxy acid compound which is free from a hydroxylated fatty acid radical, said reaction being only to an extent sufficient to produce a water-wettable, interfacial and surface-active product, said hydroxylated fatty amino compound being first produced by a reaction selected from the group consisting of amidification, esterification and soap-formation between at least one molecular proportion of a detergent-forming fatty acid compound and a hydroxylated amine.

9. A composition for resolving a petroleum emulsion and dispersible in such an emulsion, which comprises as a component, an esterification product derived by an esterification reaction between at least one molecular proportion with respect to each other of a hydroxylated fatty amino compound and an acidic polybasic carboxy acid compound characterized by the presence of at least one free carboxyl group and at least one residue derived from a hydroxylated fatty acid compound, said reaction being only to an extent sufficient to produce a water-wettable, interfacial and surface-active product, said hydroxylated fatty amino compound being first produced by a reaction selected from the group consisting of amidification, esterification and soap-formation between at least one molecular proportion with respect to each other of a detergent-forming fatty acid compound and a hydroxylated amine.

10. A process of resolving petroleum emulsions comprising, subjecting a petroleum emulsion to the action of a small percentage of a water-wettable, interfacial and surface-active condensation product of a dicarboxy acid and a hydroxylated amino compound reacted only to an extent sufficient to produce a water-wettable, interfacial and surface-active compound, said hydroxylated compound being derived initially by inter-action between a higher fatty acid and a hydroxy amine.

11. A process of resolving petroleum emulsions comprising, subjecting a petroleum emulsion to the action of a small percentage of a water-wettable, interfacial and surface-active esterification product derived by an esterification reaction between at least one molecular proportion with respect to the acid compound of a hydroxylated fatty amino compound and at least one molecular equivalent with respect to the amino compound of a polybasic carboxy acid compound which is free from a hydroxylated fatty acid radical, said reaction being only to an extent sufficient to produce a water-wettable, interfacial and surface-active product, said hydroxylated fatty amino compound being first produced by reaction between at least one molecular proportion with respect to each other of a detergent-forming fatty acid compound and a hydroxylated amine.

12. A process of resolving petroleum emulsions comprising, subjecting a petroleum emulsion to the action of a small percentage of a water-wettable, interfacial and surface-active esterification product derived by an esterification reaction between at least one molecular proportion with respect to each other of a hydroxylated fatty amino compound and an acidic polybasic carboxy acid compound characterized by the presence of at least one free carboxyl group and at least one residue derived from a hydroxylated fatty acid compound, said reaction being only to an extent sufficient to produce a water-wettable, interfacial and surface-active product, said hydroxylated fatty amino compound being first produced by a reaction between at least one molecular proportion with respect to each other of a detergent-forming fatty acid compound and a hydroxylated amine.

13. A composition for resolving a petroleum emulsion and dispersible in such an emulsion, which comprises a condensation product of, first, an amine soap of the type represented by the formula:

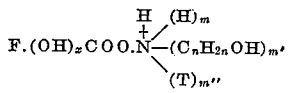

where F.(OH)$_x$COO represents the acyl radical derived from a detergent-forming acid;

represents an alkylol radical; (T) represents a radical selected from the group consisting of alkyl, aralkyl and acylated alkylol radicals; $x$ represents a number selected from the group consisting of 0, 1 and 2; $m$ represents a numeral selected from the group consisting of 0, 1 and 2; $m'$ represents a numeral selected from the group consisting of 1, 2 and 3; and $m''$ represents a numeral selected from the group consisting of 0, 1 and 2; and with the proviso that $m+m'+m''$ equals 3; and, second, a carboxy acid selected from the group consisting of polybasic carboxy acids and polybasic carboxy acid esters having a residue from a hydroxylated fatty body, and including sulfo-derivatives thereof.

14. A composition for resolving a petroleum emulsion and dispersible in such an emulsion which comprises a condensation product of, first, an amide of the type represented by the formula:

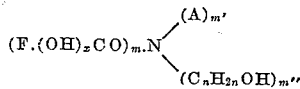

where (F.(OH)$_x$CO) represents a residue from a detergent-forming acid; (A) represents a radical selected from the group consisting of hydrogen, alkyl, aralkyl and acylated alkylol radicals; (C$_n$H$_{2n}$OH) represents an alkylol radical; $x$ represents a numeral selected from the group consisting of 0, 1 and 2; $m$ represents a numeral selected from the group consisting of 1 and 2; $m'$ represents a numeral selected from the group consisting of 0, 1 and 2; and $m''$ represents a numeral selected from the group consisting of 1 and 2; and with the provision that $m+m'+m''$ equals 3; and, second, a carboxy acid selected from the group consisting of polybasic carboxy acids and polybasic carboxy acid esters having a residue from a hydroxylated fatty body, and including sulfo-derivatives thereof.

15. A process of resolving petroleum emulsions comprising, subjecting a petroleum emulsion to the action of a small percentage of a water-wettable, interfacial and surface-active condensation product of, first, an amine soap of the type represented by the formula:

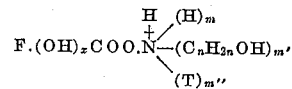

where F.(OH)$_x$COO represents the acyl radical derived from a detergent-forming acid;

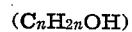

represents an alkylol radical; (T) represents a radical selected from the group consisting of alkyl, aralkyl and acylated alkylol radicals; $x$ represents a number selected from the group consisting of 0, 1 and 2; $m$ represents a numeral selected from the group consisting of 0, 1 and 2; $m'$ represents a numeral selected from the group consisting of 1, 2 and 3; and $m''$ represents a numeral selected from the group consisting of 0, 1 and 2; and with the proviso that $m+m'+m''$ equals 3; and, second, a carboxy acid selected from the group consisting of a polybasic carboxy acid and polybasic carboxy acid esters having a residue from the hydroxylated fatty body, and including sulfo-derivatives thereof.

16. A process of resolving petroleum emulsions comprising, subjecting a petroleum emulsion to the action of a small percentage of a water-wettable, interfacial and surface-active condensation product of, first, an amide of the type represented by the formula:

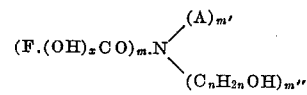

where (F.(OH)$_x$CO) represents a residue from a detergent-forming acid; (A) represents a radical selected from the group consisting of hydrogen, alkyl, aralkyl and acylated alkylol radicals; (C$_n$H$_{2n}$OH) represents an alkylol radical; $x$ represents a numeral selected from the group consisting of 0, 1 and 2; $m$ represents a numeral selected from the group consisting of 1 and 2; $m'$ represents a numeral selected from the group consisting of 0, 1 and 2; and $m''$ represents a numeral selected from the group consisting of 1 and 2; and with the proviso that $m+m'+m''$ equals 3; and, second, a carboxy acid selected from the group consisting of polybasic carboxy acids and polybasic carboxy acid esters having a residue from a hydroxylated fatty body, and including sulfo-derivatives thereof.

17. A composition for resolving a petroleum emulsion and dispersible in such an emulsion, which comprises a condensation product of, first, an amine soap of the type represented by the formula:

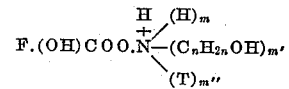

where F.(OH)COO represents the oxy-acyl radical derived from ricinoleic acid; (C$_n$H$_{2n}$OH) represents an alkylol radical; (T) represents a radical selected from the group consisting of alkyl, aralkyl and acylated alkylol radicals; $m$ represents a numeral selected from the group consisting of 0, 1 and 2; $m'$ represents a numeral selected from the group consisting of 1, 2 and 3; and $m''$ represents a numeral selected from the group consisting of 0, 1 and 2; and with the proviso that $m+m'+m''$ equals 3; and, second, phthalic anhydride.

18. A composition for resolving a petroleum emulsion and dispersible in such an emulsion which comprises a condensation product of, first, an amide of the type represented by the formula:

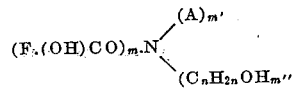

where (F(OH)CO) represents a residue derived from ricinoleic acid; (A) represents a residue selected from the group consisting of hydrogen, alkyl, aralkyl and acylated alkylol residues; ($C_nH_{2n}OH$) represents an alkylol radical; m represents a numeral selected from the group consisting of 1 and 2; $m'$ represents a numeral selected from the group consisting of 0, 1 and 2; and $m''$ represents a numeral selected from the group consisting of 1 and 2; and with the proviso that $m+m'+m''$ equals 3; and, second, phthalic anhydride.

TRUMAN B. WAYNE.

REFERENCES CITED

The following references are of record in the file of this patent:

UNITED STATES PATENTS

| Number | Name | Date |
|---|---|---|
| 1,918,222 | Weisberg et al. | July 11, 1933 |
| 2,094,609 | Kritchevsky | Oct. 5, 1937 |
| 2,106,522 | Ellis | Jan. 25, 1938 |
| 2,154,422 | De Groote et al. | Apr. 18, 1939 |
| 2,154,423 | De Groote et al. | Apr. 18, 1939 |
| 2,166,431 | De Groote | July 18, 1939 |
| 2,166,432 | De Groote | July 18, 1939 |
| 2,214,784 | Wayne | Sept. 17, 1940 |